(12) United States Patent
Crane et al.

(10) Patent No.: US 9,944,472 B2
(45) Date of Patent: Apr. 17, 2018

(54) BEVERAGE DISPENSING APPARATUS

(71) Applicant: Cornelius, Inc., St. Paul, MN (US)

(72) Inventors: Bryant Crane, Chicago, IL (US);
Thaddeus Jablonski, Palatine, IL (US);
David M. Joyce, Des Plaines, IL (US);
James Kasallis, Lombard, IL (US);
Jeffrey DeBuhr, Barlett, IL (US)

(73) Assignee: Cornelius, Inc., Osseo, MN (US)

( * ) Notice: Subject to any disclaimer, the term of this patent is extended or adjusted under 35 U.S.C. 154(b) by 13 days.

(21) Appl. No.: 15/011,808

(22) Filed: Feb. 1, 2016

(65) Prior Publication Data

US 2016/0185536 A1 Jun. 30, 2016

Related U.S. Application Data

(63) Continuation of application No. 13/625,163, filed on Sep. 24, 2012, now Pat. No. 9,290,371.

(60) Provisional application No. 61/537,709, filed on Sep. 22, 2011.

(51) Int. Cl.
| | |
|---|---|
| *B67D 1/08* | (2006.01) |
| *B65G 47/90* | (2006.01) |
| *B67D 1/00* | (2006.01) |
| *B66F 19/00* | (2006.01) |

(52) U.S. Cl.
CPC ............ *B65G 47/901* (2013.01); *B66F 19/00* (2013.01); *B67D 1/0041* (2013.01); *B67D 1/0888* (2013.01); *B67D 1/0894* (2013.01); *B67D 2210/00076* (2013.01)

(58) Field of Classification Search
CPC ..... B65G 47/901; B66F 19/00; B67D 1/0041; B67D 1/0888; B67D 1/0894; B67D 2210/00076; B67D 2210/00078
USPC ..... 141/1, 94, 104, 163, 168–169, 172–174; 222/1, 23, 41
See application file for complete search history.

(56) References Cited

U.S. PATENT DOCUMENTS

| | | | |
|---|---|---|---|
| 4,590,975 A | 5/1986 | Credle, Jr. | |
| 4,944,337 A | 7/1990 | Credle et al. | |
| 4,951,719 A | 8/1990 | Wiley et al. | |
| 4,961,447 A * | 10/1990 | Credle, Jr. ........... | B67D 1/0021 141/1 |
| 4,967,808 A | 11/1990 | Credle et al. | |
| 4,967,932 A | 11/1990 | Wiley et al. | |
| 4,971,120 A | 11/1990 | Credle et al. | |
| 5,058,630 A | 10/1991 | Wiley et al. | |
| 5,072,859 A | 12/1991 | Wiley et al. | |

(Continued)

FOREIGN PATENT DOCUMENTS

EP 2006812 12/2008

*Primary Examiner* — Nicolas A Arnett
(74) *Attorney, Agent, or Firm* — Andrus Intellectual Property Law, LLP

(57) ABSTRACT

A beverage dispensing apparatus includes a dispensing structure, a transportation mechanism linked with the dispensing structure and a staging structure linked with the transportation mechanism. A control system is linked with the dispensing structure, staging structure and the transportation mechanism. A sensor mechanism is linked with the control system. The sensor mechanism provides signals indicating the position of a cup. A cup identification system having an interactive display is connected to the control system. The display has visual characteristics indicating the position and characteristics of a cup.

26 Claims, 7 Drawing Sheets

(56) References Cited

U.S. PATENT DOCUMENTS

| | | | |
|---|---|---|---|
| 5,074,341 A * | 12/1991 | Credle, Jr. | B67D 1/0021 141/1 |
| 5,141,130 A | 8/1992 | Wiley et al. | |
| 5,261,467 A * | 11/1993 | Yamamoto | G07F 13/10 141/129 |
| 5,881,917 A | 3/1999 | Jones et al. | |
| 6,053,359 A | 4/2000 | Goulet et al. | |
| 6,102,146 A * | 8/2000 | Schmidt | B60K 28/16 123/322 |
| 6,102,246 A | 8/2000 | Goulet et al. | |
| 6,482,321 B1 | 11/2002 | Bossler et al. | |
| 6,871,676 B2 | 3/2005 | Sus et al. | |
| 7,032,631 B2 * | 4/2006 | Py | B29C 66/71 141/284 |
| 7,100,646 B2 * | 9/2006 | Py | A61J 1/1406 141/237 |
| 7,269,960 B2 | 9/2007 | Elsom et al. | |
| 7,577,498 B2 | 8/2009 | Jennings et al. | |
| 7,624,895 B2 | 12/2009 | Haskayne | |
| 7,845,375 B2 | 12/2010 | Dorney | |
| 7,954,521 B2 * | 6/2011 | Py | B65D 51/002 141/329 |
| 8,127,805 B2 | 3/2012 | Dorney | |
| 8,151,832 B1 | 4/2012 | Dorney | |
| 8,776,838 B1 | 7/2014 | Dorney | |
| 9,045,323 B2 * | 6/2015 | Crane | B67D 1/0041 |
| 9,290,371 B2 * | 3/2016 | Crane | B67D 1/0041 |
| 2002/0056721 A1 | 5/2002 | Phillips et al. | |
| 2006/0042298 A1 | 3/2006 | Elsom et al. | |
| 2006/0131323 A1 | 6/2006 | Akuzawa et al. | |
| 2007/0215239 A1 | 9/2007 | Dorney | |
| 2010/0147417 A1 | 6/2010 | Dorney | |
| 2010/0181458 A1 | 7/2010 | Liu | |
| 2010/0206424 A1 | 8/2010 | Gustafsson | |
| 2011/0036452 A1 | 2/2011 | Schnyder | |
| 2013/0074980 A1 * | 3/2013 | Crane | B67D 1/0041 141/9 |
| 2013/0075419 A1 * | 3/2013 | Crane | B67D 1/0041 221/211 |
| 2013/0075426 A1 | 3/2013 | Crane et al. | |
| 2013/0282164 A1 | 10/2013 | Veloo | |
| 2014/0188271 A1 | 7/2014 | Hernandez et al. | |

\* cited by examiner

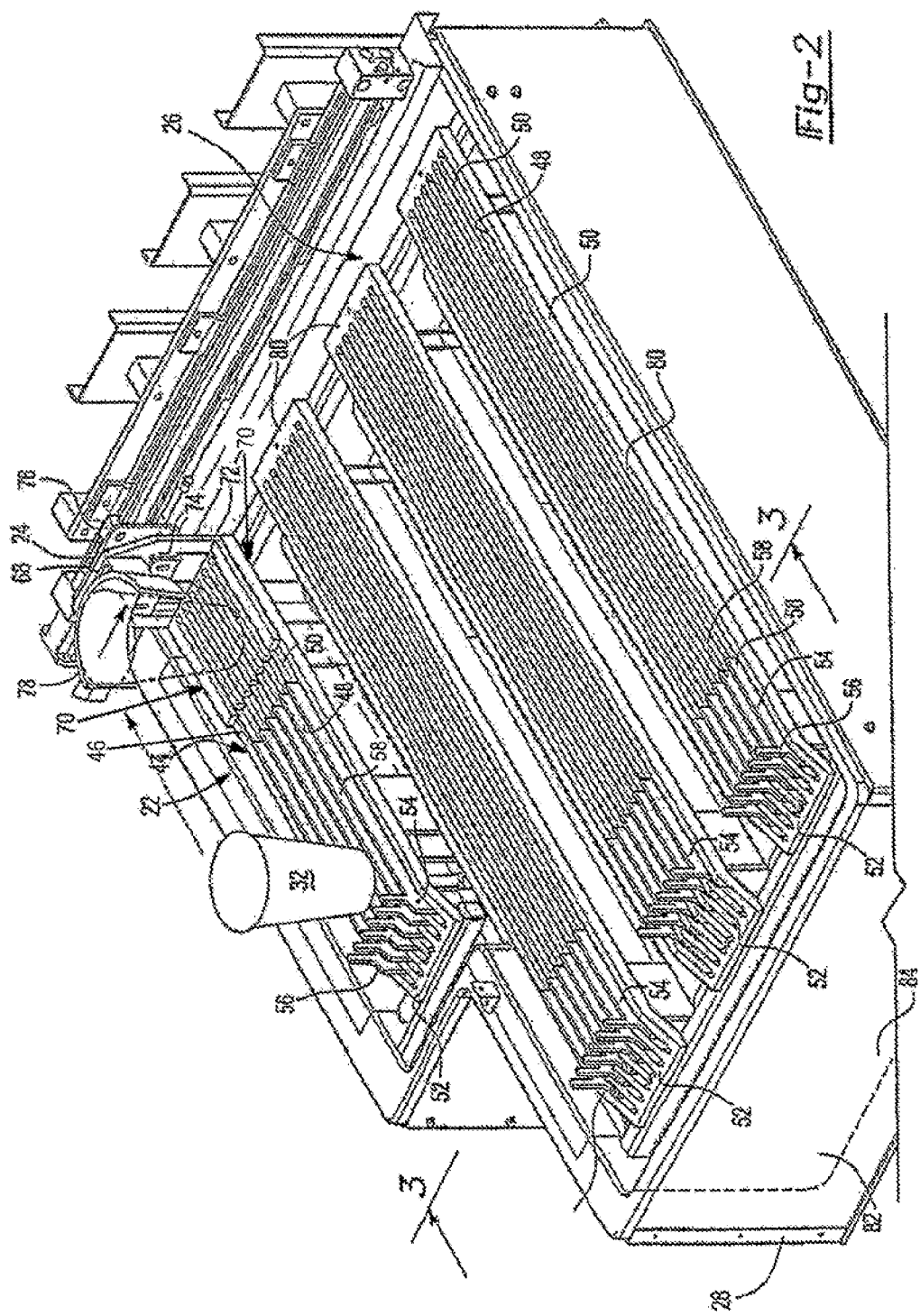

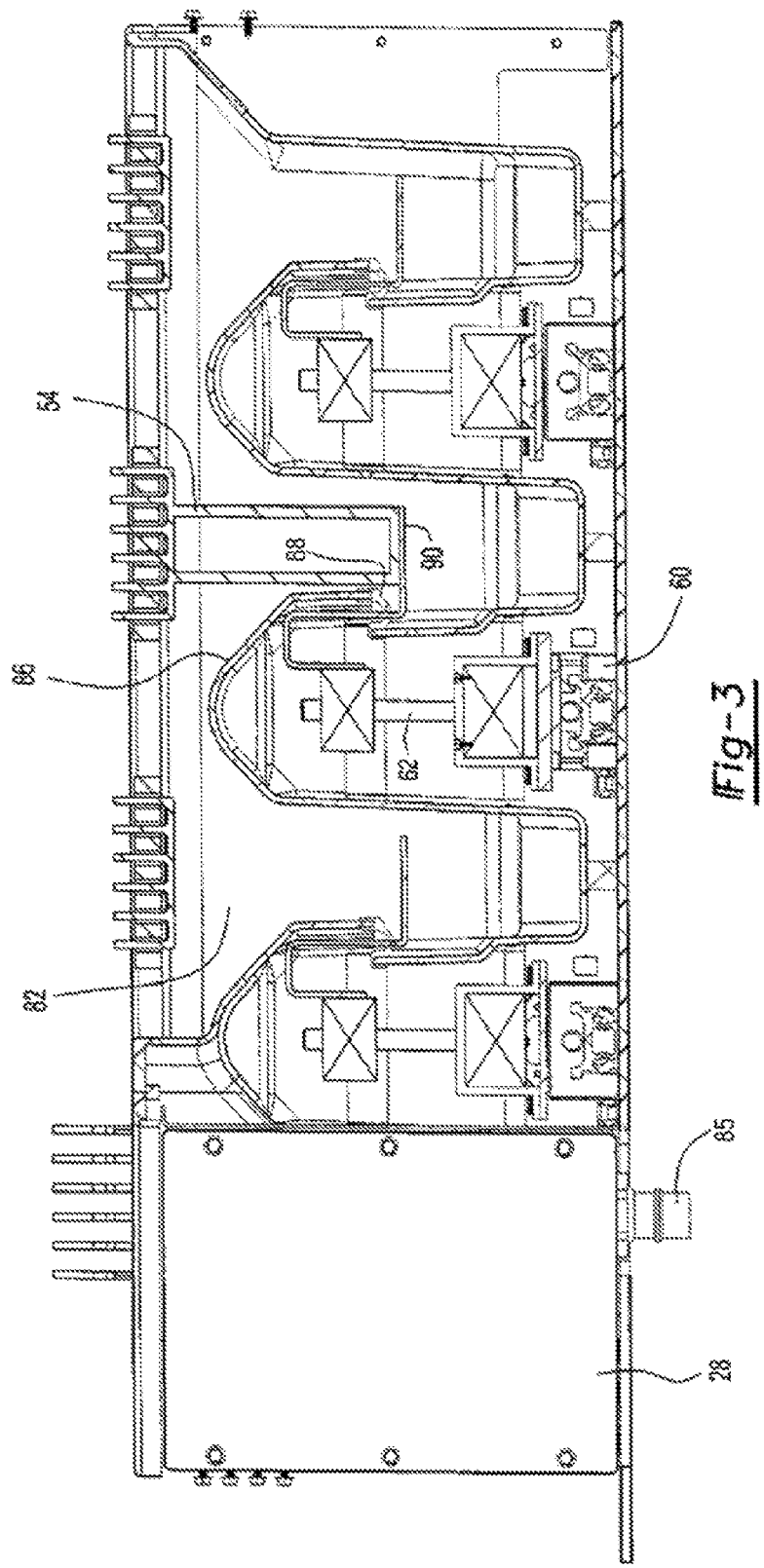

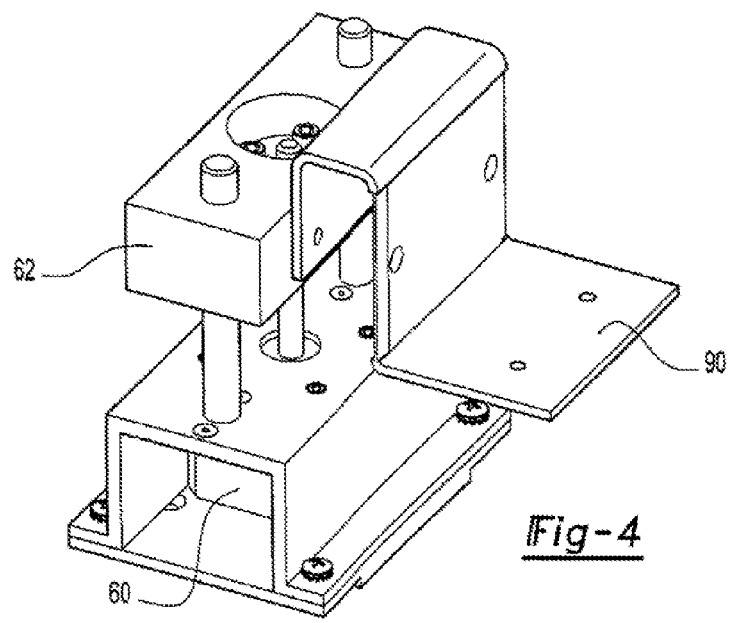
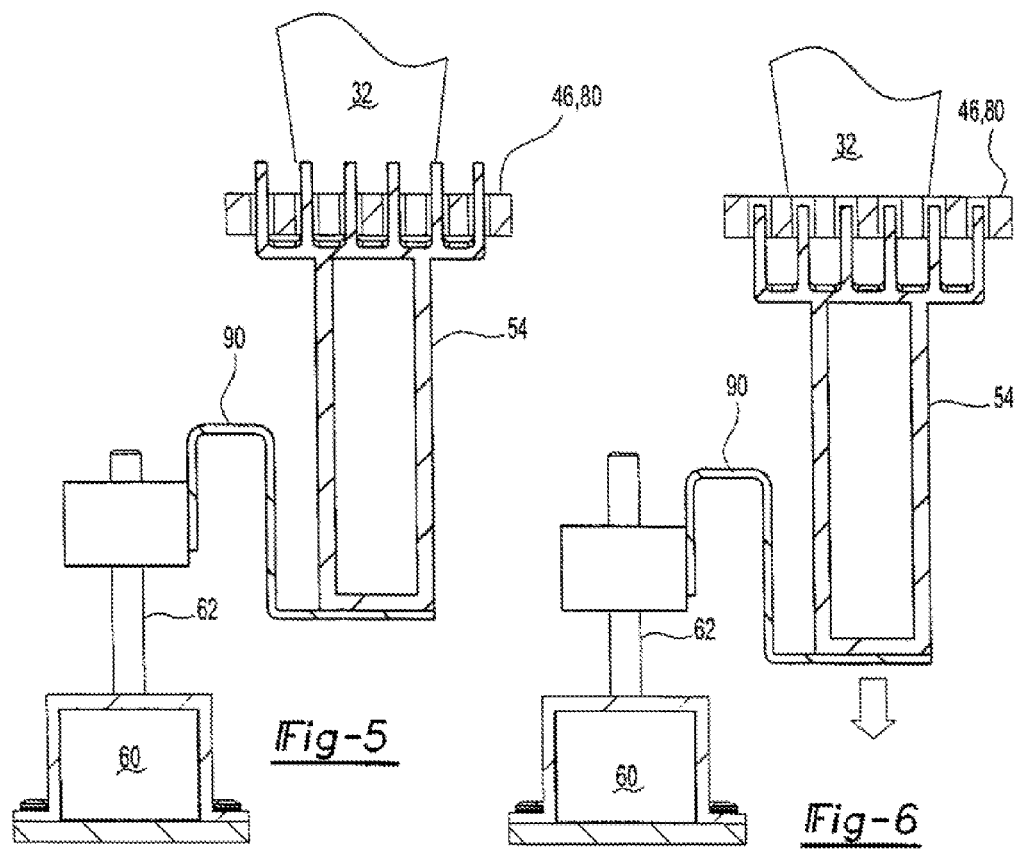

BEVERAGE DISPENSING APPARATUS

CROSS-REFERENCE TO RELATED APPLICATIONS

This application is a continuation of U.S. patent application Ser. No. 13/625,163, filed Sep. 20, 2012, which claims priority of U.S. Provisional Application No. 61/537,709 filed Sep. 22, 2011, which are incorporated herein by reference in entirety.

FIELD

The present disclosure relates to beverage dispensing apparatus including dispensing and staging of drinks.

BACKGROUND

Beverages may be dispensed through various valves such that fountain drinks may be prepared by restaurant employees. Commonly, restaurant employees may take an order and then manually pull cups and fill the beverages according to the order. There is therefore a need in the art for an improved beverage dispensing apparatus that is automated and allows a person filling an order to identify drinks grouped by order or type. There is also a need in the art for an improved beverage dispensing system that automates the drink dispensing procedure and transports beverages to a desired area where they may be identified and utilized by restaurant personnel.

SUMMARY

In one aspect there is disclosed, a beverage dispensing apparatus that includes a dispensing structure, a transportation mechanism linked with the dispensing structure and a staging structure linked with the transportation mechanism. A lifting structure is positioned beneath and movable along Y and Z axes relative to the dispensing structure and the staging structure.

In another aspect there is disclosed, a beverage dispensing apparatus includes a dispensing structure, a transportation mechanism linked with the dispensing structure and a staging structure linked with the transportation mechanism. A control system is linked with the dispensing structure, staging structure and the transportation mechanism. A sensor mechanism is linked with the control system. The sensor mechanism provides signals indicating the position of a cup. A cup identification system having an interactive display is connected to the control system. The display has visual characteristics indicating the position and characteristics of a cup.

In a further aspect there is disclosed, a beverage dispensing apparatus includes a dispensing structure, a transportation mechanism linked with the dispensing structure and a staging structure linked with the transportation structure. The dispensing structure includes a dispensing lane having a rail grid including a plurality of separated rails having spaces there between and a lift platform having a plurality of spaced rails and a raised front edge wherein the rails of the lift platform are positioned to move within the spaces of the rail grid of the dispensing lane in the Y and Z axes. The staging structure is linked with the transportation mechanism. The staging structure includes a plurality of rail grids laterally spaced from each other on an X axis wherein each of the plurality of rail grids includes a plurality of separated rails having spaces there between and an angled front edge. A control system is linked with the dispensing structure, staging structure and the transportation mechanism. A sensor mechanism is linked with the control system. The sensor mechanism provides signals indicating the position of a cup. A cup identification system having an interactive display is connected to the control system. The display has visual characteristics indicating the position and characteristics of a cup.

BRIEF DESCRIPTION OF THE DRAWINGS

FIG. 2 is a partial perspective view of the dispensing structure, transportation mechanism and staging structure;

FIG. 3 is a partial sectional view of the sink structure including the housing and wipers and the lift platform;

FIG. 4 is a perspective view of the actuators and bracket of the lift platform;

FIG. 5 is a sectional view of the actuators and lift platform of the staging structure with the platform raised;

FIG. 6 is a partial perspective view of the actuators and lift platform of the staging structure with the lift platform lowered;

DETAILED DESCRIPTION OF THE DRAWINGS

Figure 1:
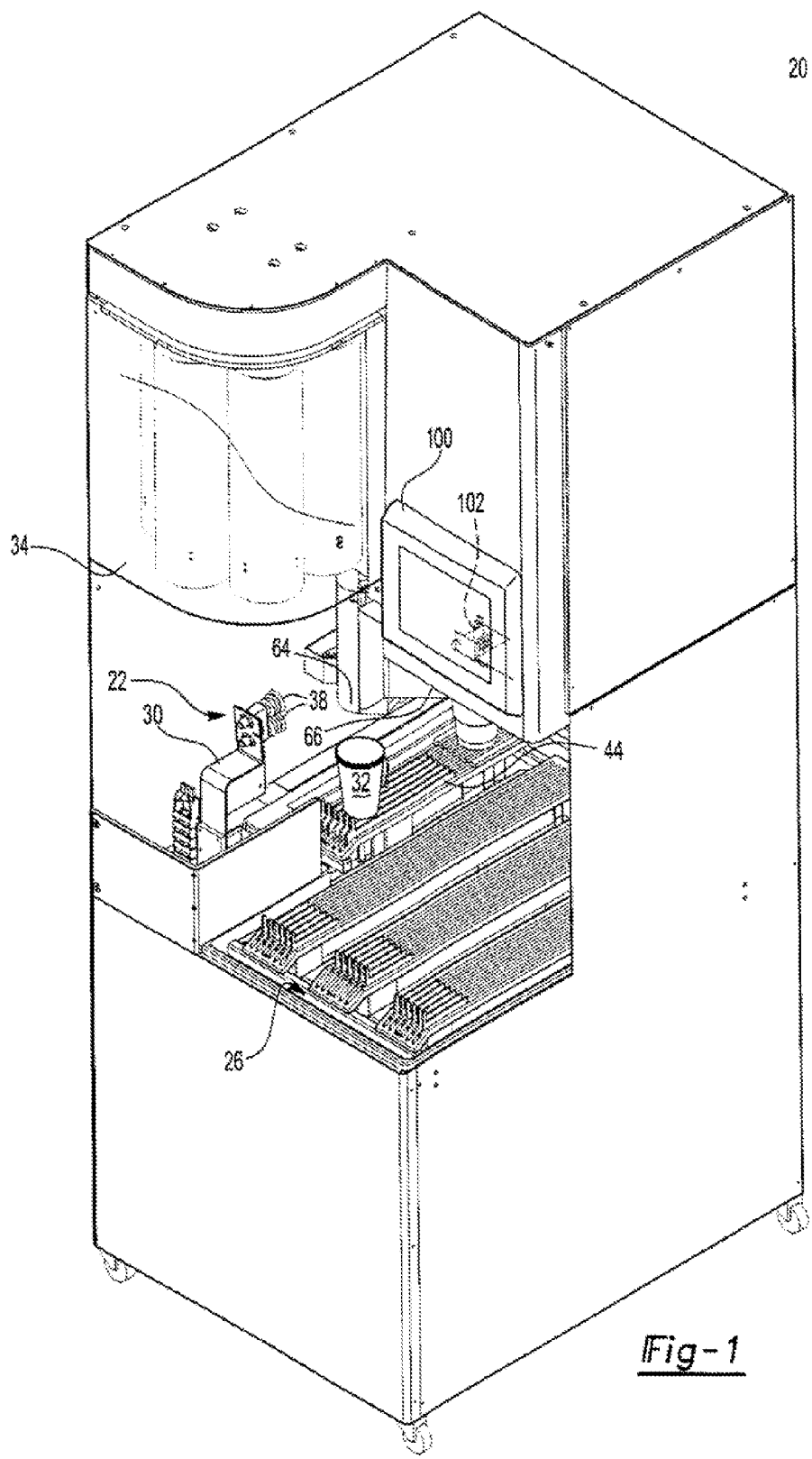
FIG. 1 is a perspective view of one embodiment of a beverage dispensing apparatus.

It should be realized that the descriptions provided herein and made with reference to an X, Y and Z axis of the apparatus as shown in the drawings. The X axis may refer to a lateral axis or lateral movement. The Y axis may refer to a forward and backward axis and corresponding movement forward and backwards. The Z axis may refer to an up and down axis and corresponding movement up and down. These terms may be used interchangeably in the specification and claims.

Referring to FIGS. 1-10, there is shown one embodiment of a beverage dispensing apparatus 20. In one aspect, the beverage dispensing apparatus 20 includes a dispensing structure 22, a transportation mechanism 24, and a staging structure 26. In one aspect, the dispensing structure 22 may be decoupled from the transportation mechanism 24 and staging structure 26. The beverage dispensing apparatus may include a housing 28 that contains the various structures of the beverage dispensing apparatus.

Figure 10:
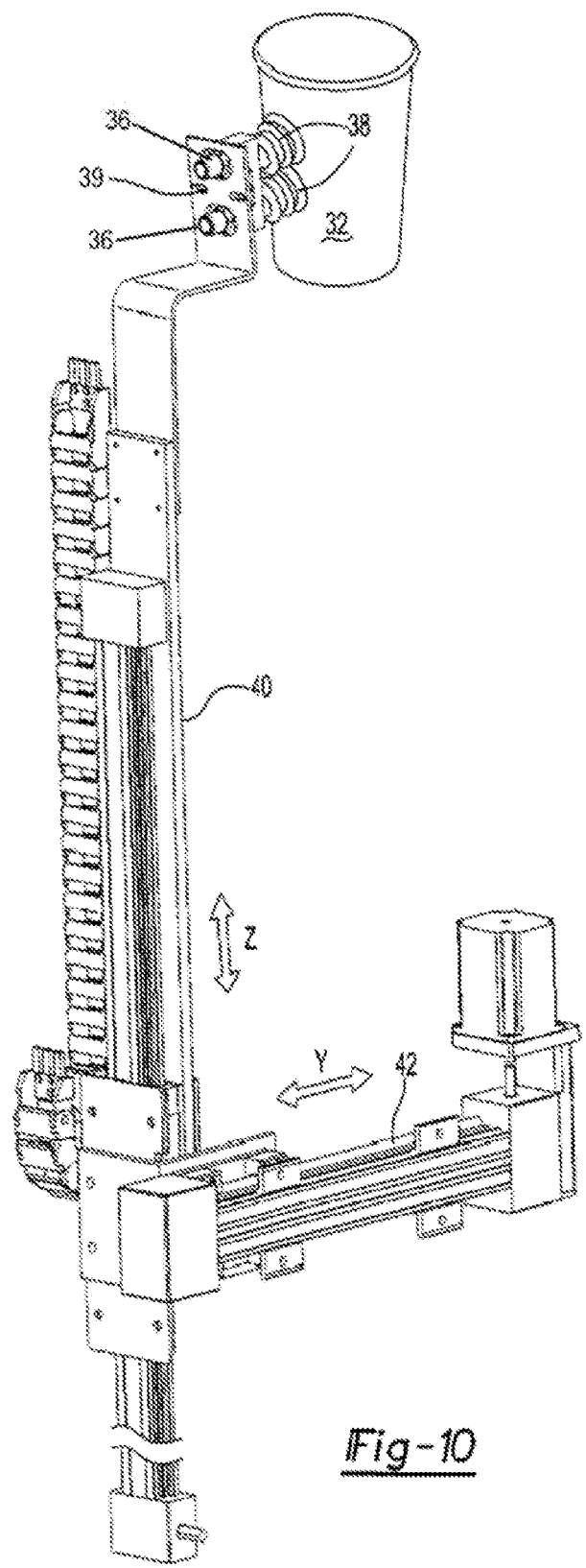
FIG. 10 is a partial perspective view of a cup placement device.

Referring to FIGS. 1 and 10, there is shown one embodiment of a dispensing structure 22 of the beverage dispensing apparatus 20. The beverage dispensing structure 22 may include a cup placement device 30. Various cup placement devices 30 may be utilized. For example, various gripping type mechanisms may remove a cup 32 from a storage bin 34 and position it for dispensing of ice and beverage. In the depicted embodiment, the cup placement device 30 includes actuators 36 having suction cup gripping mechanisms 38 that may be actuated using a pneumatic air control system 39 linked with the suction cups 38. Additionally, various actuators such as a Z and Y actuator 40, 42 as shown in the depicted embodiment may move the cup placement device 30 from one location to another such that cups 32 may be provided in a desired location.

The dispensing structure 22 also includes a dispensing lane structure 44. In the depicted embodiment, the dispensing lane structure 44 is positioned on a common X axis with the cup placement device 30. The dispensing lane structure 44 includes a rail grid 46 having spaces 48 between a plurality of rails 50 such that water or a beverage may pass through the grid 46. Additionally, the rail grid 46 includes an angled front edge 52 such that ice and foreign objects on the rail grid 46 may be moved from the rail by a lift platform 54, as will be described in more detail below. Additionally, the dispensing lane structure 44 includes a lift platform 54 having a raised front edge 56 and a plurality of rails 58 that are positioned to move within the spaces 48 defined in the rail grid 46 of the dispensing lane. The lift platform 54 is coupled with Y and Z actuators 60, 62 such that the lift platform 54 may be moved along a Y direction of the rail grid 46 as well as in a Z direction or up and down relative to the rail grid 46. In this manner, the lift platform 54 may be moved below the rail grid 46 in the Y direction and then raised and lowered under a cup 32 that is positioned on the rail grid 46 such that the cup 32 may be moved from one location to another along the Y axis of the rail grid 46.

In one aspect, the lifting mechanism or Z actuator 62 is capable of at least supporting and lifting a minimum weight determined by the largest cup filled with beverage. Additionally, the Z actuator 62 may lift the lift platform 54 straight up and slow enough so that a cup 32 does not fall over or cause liquid to be sloshed over an edge of the side wall of the cup 32. Further, the stopping and starting for the Y actuator 60 which may be a linear type mechanism maybe chosen such that the acceleration and deceleration coupled with the velocity of the motor move the cup 32 in a stable manner.

The dispensing structure 22 additionally includes an ice dispenser 64 and a beverage dispensing valve 66 positioned above the rail grid 46 of the dispensing lane 44. In one aspect, the ice dispenser 64 and beverage dispensing valve 66 are positioned along the Y axis of the dispensing lane structure 44 and are spaced from each other along the Y axis. The dispensing lane structure 44 includes a position (D1) along the Y axis of the dispensing lane 44 that corresponds to an ice filling position below the ice dispenser 64. Additionally, the dispensing lane structure 44 includes a position (D2) along the Y axis of the dispensing lane 44 below the beverage dispensing valve 66 corresponding to a beverage filling position.

The dispensing structure 22 additionally includes an X transport structure 68 positioned along a back of the beverage dispensing apparatus 20. The X transport structure 68 includes a rail structure 70 having a rail grid 72 corresponding to the same spaced rail grid structure of the dispensing lane structure previously described above. However, the rail grid 72 is positioned above the dispensing lane structure 44 in the Z axis. Additionally, the X transport structure 68 includes a bracket 74 coupled with the rail grid 72 and attached to an actuator 76 that moves the rail grid structure 72 along an X axis as shown in the figures. Additionally, lateral support structures or members 78 may be attached to the bracket 74 of the X transport structure 68 for supporting a cup 32 as it travels along the X direction. Various actuators may be utilized to move the rail grid 72 about the X axis. For example, linear actuators may be utilized and may be calibrated such that movement does not spill a beverage after it has been filled underneath the beverage dispensing valve 66.

In one aspect, the dispensing structure 22 is a decoupled zone that allows ice to be dispensed into one cup 32 while the desired beverage is being poured simultaneously into a second cup 32, and also while the cup placement device 30 is positioning a cup on the dispensing lane 44. This decoupled zone separates the dispense structure 22 from the cup placement device 30 and a staging structure 26, as will be discussed in more detail below.

Figure 7:
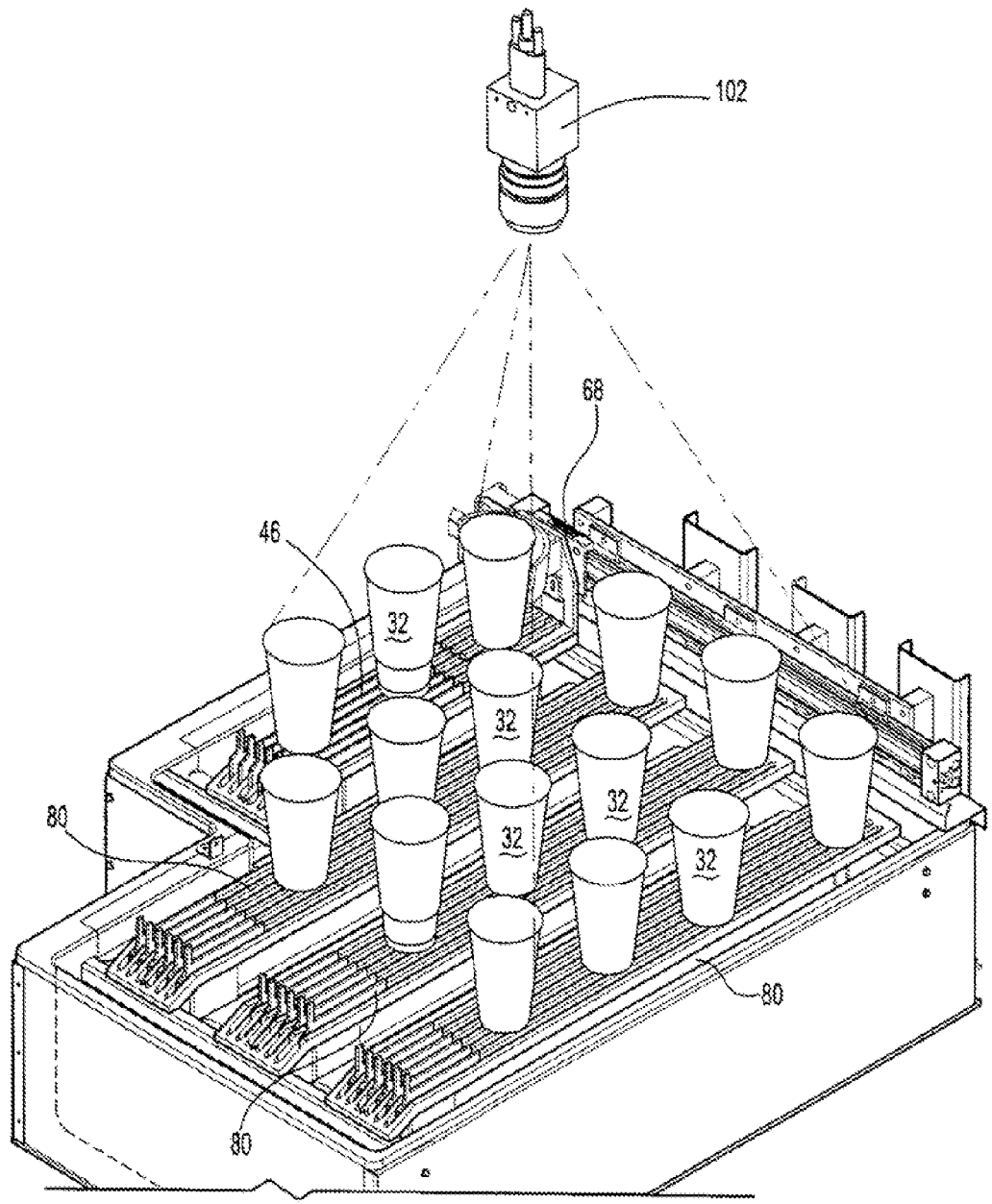
FIG. 7 is a partial perspective view of the dispensing structure, transportation mechanism and staging structure with the sensor.

Referring to FIGS. 1, 2 and 7, there is shown a staging structure 26 of the beverage dispensing apparatus 20. The staging structure 26 includes a plurality of rail grids 80 that are laterally spaced from each other along the X axis. The rail grids 80 again are the same as that described above with respect to the dispensing lane structure 44. The rail grid 80 includes a plurality of rails 50 having spaces 48 there between and an angled front edge 52 as previously described. Additionally, a lift platform 54 is positioned under each of the plurality of rail grids 80 and includes Y and Z actuators 60, 62 as described above. Again, the lift platform 54 may include a raised front edge 56 for defining a plowing structure such that ice or foreign objects that may be positioned on the rail grid 80 may be swept towards a front along the Y axis to the angled front edge 52 of the rail grid 80 such that foreign objects may be removed that can cause a cup 32 or drink to be spilled. Each of the plurality of rail grids 80 includes a plurality of positions along the Y axis of the rail grids 80 for locating filled beverage cups, as will be discussed in more detail below.

The beverage dispensing apparatus 20 includes a housing 28 that surrounds the staging structure 26 as well as the dispensing structure 22 and defines a sink area 82. In one aspect, the sink area 82 includes a trough 84 positioned at a front of the apparatus relative to the angled portion 52 of the rail grids 50 such that ice or foreign objects may be caught within the trough 84. Additionally, the trough 84 may include drains 85 as seen in FIG. 3. In one aspect, a drain 85 may be positioned at all three of the staging lanes 80 and the dispensing lane 44. The drains 85 may be linked with a drain tube to allow liquid to flow to a desired area.

In one aspect, the Y and Z actuators 60, 62 associated with the lift platform 54 are protected from contact with a liquid or other object such as ice. In one aspect, the Y and Z actuators 60, 62 are located within the sink area 82. To prevent the direct contact of liquid, housings 86 including wipers 88 are positioned above the moving parts protecting them. As best shown in FIGS. 3-6, the lift platform 54 attaches to a bracket 90 that slides in between the wipers 88. In this manner, the bracket 90 makes it difficult for any liquid to penetrate to the Y and Z actuators 60, 62 positioned below.

Figure 8:
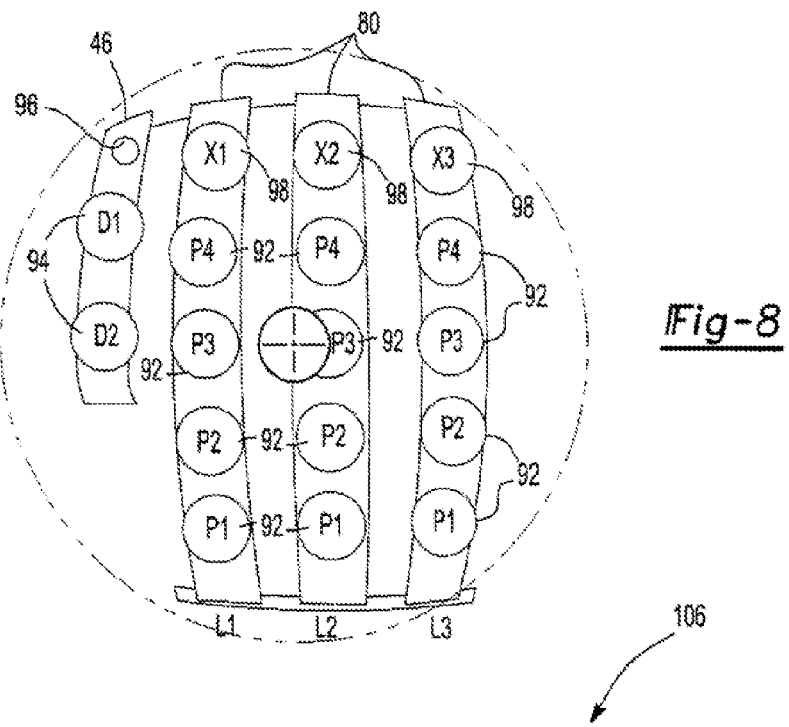
FIG. 8 is a top view showing the positions of the dispensing and staging lanes.

In one aspect, dispensing and staging structures 22, 26 as described above include a plurality of defined positions to identify where a specific beverage is located. In one aspect, the staging structure 26 may include four defined positions 92 for each of the rail grids 80 that progress together. Additionally, the dispensing structure 22 may include two dispensing positions 94 located between the ice dispense 64 and beverage valve 66 as well as an X translation position 96 that moves the filled beverage along an X axis into one of three X positions 98 on the rail grids as best seen in FIG. 8. It should be realized that various numbers of staging locations 92 and dispensing locations may be utilized. For example, the staging structure may include nine staging locations 92 rather than twelve staging locations 92. In one aspect, the twelve cup locations 92 within the staging area are independent of one another allowing for control of any location on the staging grid 80. A control system 100 can dispense the drink orders in a first-in first-out method or an intelligent sorting type method. The control system 100 may make decisions on which order to process first based on food preparation times as well as other requirements that may be utilized such as the amount of drinks with an order as well as various other parameters from the point of sale orders.

In one aspect, the control system 100 may review outputs from a sensing system 102 such as an ultrasonic, infrared, or an optical and vision based system as shown in the figures. In this manner, the control system 100 identifies positions within the staging structure 26 as well as the dispensing structure 22. As the point of sale orders are processed and a drink is completed, the drink will be positioned in various positions in the dispensing and staging structure 22, 26. In one aspect, when the staging structure 26 is completely empty a completed drink will be positioned into lane 1, position 1 or L1, P1 as shown in FIG. 8. The control system 100 then looks to see if the next drink is within the same order and reviews the sensor feedback. If the next drink is for the same order and the first drink is still within the L1, P1 position, then the control system 100 would actuate the lift platform 54 associated with the lane 1 and position the cup 32 into L1, P2 position. If the previous drink has been removed, then the control system may move the new drink to the original position L1, P1. For example, if there are four drinks in an order and none are pulled, the fourth cup may be positioned in the L1, P4 or in the L2, P3 configuration. In this case, the first drink of the next order would then end in L3, P1.

The control system 100 repositions open staging positions 92 by back filling. The control logic is programmed such that it allows the system to always have drinks located at the front of the unit so that they may be easily accessible by an operator of the beverage dispensing apparatus 20. With each lane position being fully independent, cups 32 can be easily repositioned when the sensor provides feedback stating a cup in a specified position has been removed. For example, if P1 is removed and P2 and P3 still exist within a lane, then the control mechanism 100 can perform an operation such that the lift platform 54 is raised below the cup 32 and can move these cups up one position at a time. If P1 and P2 are both removed, then a cup in P3 can be moved to the front position P1. This movement opens up the back positions to be filled with new orders.

Additionally, if the staging structure is partially filled the control mechanism 100 may move filled cups 32 to various positions. For example, if all lanes have P1 filled with an order, the next order may fill in the next open positions. Orders may possibly be filled across multiple lanes. If only single positions are available and there are single and multiple drinks within a point of sale, then the control system 100 will populate the single orders filling in the open positions. Additionally, if there are twelve individual single orders the orders may start filling at L1, P1. As long as no cups are pulled, the next orders continue to fill up in the following progression: L2, P1; L3, P1; L1, P2 all the way through until all twelve positions are occupied.

As stated above, a sensor mechanism 102 is associated with the control system 100. Various mechanisms may be utilized such as discrete sensors positioned at each location either in the sink area or positioned above a desired location along the Y axis of the rail grid. A further option is a vision or optical type system that utilizes one camera to view the entire area, as shown in FIG. 7. In one aspect, the vision system covers the staging structure 26 as well as the dispensing 22 and transport areas 24. An optical type or vision system may utilize information provided by a camera to supplement error handling associated with the system. For example, should a cup 32 not be positioned correctly under the ice dispensing or beverage dispensing portion of the dispensing lane, the control system 100 may recognize that there is no cup 32 positioned in a desired location such that a beverage or ice is not dispensed into a cup 32 that is not present.

Figure 9:
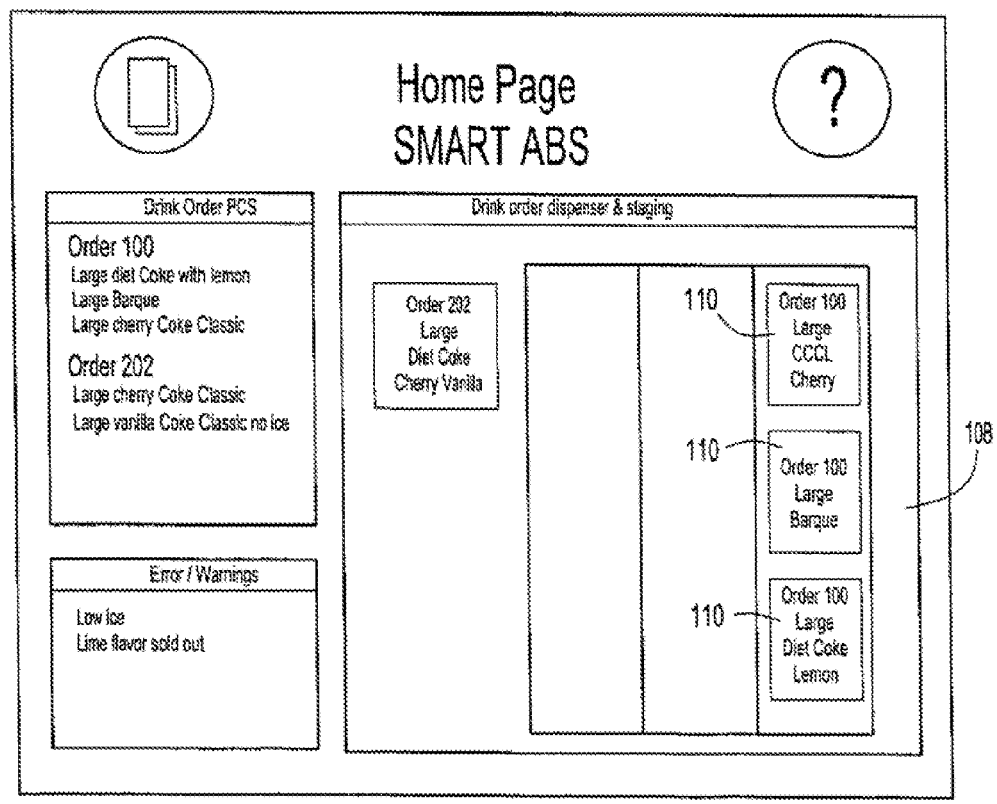
FIG. 9 is view of the cup identification system and display.

In one aspect, as depicted in FIG. 9 a cup identification system 106 is associated with the beverage dispensing apparatus 20. The cup identification system 106 may include a touch screen or information unit 108 that identifies specific locations and orders associated with the beverage dispensing apparatus 20. In one aspect, as the point of sale orders are received, the drink orders are populated on the screen 108. Each order may be identified differently using a shape or color to make it easy to identify for an operator. In one aspect, each cup identifier 110 positioned on the screen 108 indicates the order number and a size or type of drink contents. As the desired drink progresses through the beverage dispensing apparatus 20, the identifier 110 also moves on the screen 108 at the same locations corresponding to positions on the rail grids. In this manner, an operator may easily identify a desired drink associated with a specific order and know exactly where it is positioned within the beverage dispensing apparatus 20.

It is also disclosed herein a process for dispensing and locating a beverage. The process includes the step of an order being entered by an operator with a corresponding display on the cup identification system 106 displaying a drink to be dispensed. The cup 32 will then be picked by the cup placement device 30 using one of two methods. In one method, cups 32 may be stored in a linear storage system such that a linear actuator along the Y axis moves to a proper cup 32 within a plurality of tubes oriented in a single row. Alternatively, a rotary cup storage device as shown in FIG. 1 may include a cup turret that rotates to a proper cup so it is aligned with the center of the dispense lane 44. A Z actuator 40 then moves the cup 32 upward to align the suction cups 38 to the highest exposed part of the cup 32 just below the tube. Input air is then provided to the suction cup 38 such that vacuum generators are actuated. Next an actuator 42 in the Y direction moves the suction cups 38 toward the cup 32 perpendicular to the center line of the cup 32 and engages with the cup 32. If vacuum sensors are utilized, a control signal will notify that a cup 32 is ready to be pulled. Next the Z actuator 40 moves the cup 32 downward and the cup 32 is then removed from the storage device. The dispense lane actuator drives forward with the platform 54 raised such that the raised front edge 56 of the platform 54 clears any ice that might exist on the dispense lane 44. Once the platform 54 has reached the front of the rail it then lowers all the way down. Next the Y actuator 42 of the cup placement device 30 moves the cup 32 towards the dispense lane 44 and pushes the cup 32 into a desired position. Input air is then closed causing the vacuum generators to shut off. The Y and Z actuators 42, 40 move simultaneously down and away to place the cup 32 on the dispense lane grid underneath the ice dispenser 64. The Y actuator 42 moves the suction cups 38 to a rest position away from the dispensing zone. A gate then opens and a portion amount of ice is dispensed into the cup 32. The drink identifier 110 on the display 108 indicates that ice is dispensing into a desired cup 32. The platform 54 is then actuated in the Z direction below the cup 32 such that the cup 32 is raised above the rails 50. Following movement in the Z direction, the cup 32 is then moved along the Y axis to the position below the beverage dispensing nozzle 66. Once the cup 32 has been positioned to the desired location, the platform 54 then lowers the cup 32 onto the rails 50 on the desired beverage dispensing position. Following movement of the cup 32, a proper amount of beverage is dispensed by actuating multiple valves such that a syrup and water exit through a single dispense point nozzle. The drink identifier 110 on the display screen 108 indicates that a beverage is dispensing into a desired cup 32. The platform 54 below the dispense lane 44 following dispensing of the beverage into the cup 32 again positions below the cup 32 and actuates in a Z direction such that the cup 32 is lifted above the rails 50. Following movement in the Z direction, the platform is then moved in the Y direction such that it transports the cup 32 to the X transport structure. Once the cup is positioned on the rail grid of the X transport structure 68, the platform 54 then lowers below the dispensing lane grid 44. The X transport structure 68 moves the filled beverage along the X axis to a desired position on one of the staging lanes 80. Once the X transport structure is positioned along a desired lane 80, the lift platform 54 below that lane actuates in a Y direction directly underneath the X transport structure 68 and lifts the filled drink to a desired position along the Y axis of a desired staging lane 80. The control mechanism 100 provides instructions for the X transport structure 68 as well as the various lift platforms 54 of the staging lanes 80 such that drinks may be stationed within one of the staging positions based on order sequence and location availability. The staging lanes 80 as indicated above may be equipped with a sensing system 102 that states whether a cup or object exists in a desired location. The drink identifier 110 associated with the display 108 moves to that location in the staging lane once the beverage has been positioned within a specific location. In one aspect, the identifier 110 includes the order number as well as a size and drink contents for an individual cup. Once a location has been vacated by an operator removing the cup, the staging Y and X actuators and lift platforms 54 move various other cups 32 to back fill empty spaces within the staging lanes 80.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A beverage dispensing apparatus extending along an X-axis direction, a Y-axis direction that is perpendicular to the X-axis direction, and a Z-axis direction that is perpendicular to the X-axis direction and perpendicular to the Y-axis direction, the beverage dispensing apparatus comprising:
   a dispensing lane structure that has a length in the Y-axis direction and a width in the X-axis direction,
   a cup placement device configured to place cups in a plurality of cup placement locations along the length of the dispensing lane structure; and
   a lift platform that is configured to move below the length of the dispensing lane structure and vertically with respect to the dispensing lane structure in the Z-axis direction;
   wherein the lift platform is configured to move up through the dispensing lane structure from below the dispensing lane structure to thereby lift a cup off the dispensing lane structure from one of the plurality of cup placement locations and wherein the lift platform is further configured to move down through the dispensing lane structure from above the dispensing lane structure to thereby place the cup onto the dispensing lane structure in a different one of the plurality of cup placement locations.

2. The apparatus according to claim 1, further comprising Y and Z actuators that move the lift platform in the Y-axis and Z-axis directions, respectively.

3. The apparatus according to claim 1, wherein the dispensing lane structure comprises a rail grid defined by a plurality of rails having spaces therebetween.

4. The apparatus according to claim 3, wherein the lift platform comprises a plurality of rails that are positioned to move within the spaces between the plurality of rails of the rail grid.

5. The apparatus according to claim 4, wherein the rail grid comprises an angled front edge and wherein the lift platform comprises a raised front edge that defines a plowing structure configured to move ice and other objects off of the rail grid.

6. The apparatus according to claim 1, further comprising a Z-actuator and a Y-actuator that move the cup placement device in the Z-axis direction and the Y-axis direction to automatically place the cups in the plurality of locations along the dispensing structure.

7. The apparatus according to claim 1, wherein the cup placement device comprises a plurality of suction cup gripping mechanisms that are actuated by a pneumatic air control system to grip the plurality of cups.

8. The apparatus according to claim 1, further comprising an ice dispenser and a beverage dispensing valve that are positioned along the dispensing lane structure above an ice filling position and a beverage filling position, wherein the ice filling position and beverage filling position are separate and apart from each other along the dispensing lane structure.

9. The apparatus according to claim 8, wherein the ice dispenser is configured to dispense ice to a cup located in the ice filling position as the cup placement device is placing a cup in one of the plurality of cup placement locations.

10. The apparatus according to claim 1, further comprising an X-transport structure comprising a rail grid located above the dispensing lane structure with respect to the Z-axis direction, the rail grid being configured to move a cup in the X-axis direction with respect to the dispensing lane structure.

11. The apparatus according to claim 10, wherein the X-transport structure further comprises an X-actuator that moves the rail grid in the X-axis direction.

12. The apparatus according to claim 10, further comprising staging lane structure comprising a plurality of rail grids that are laterally spaced apart from each other in the X-axis direction, wherein each rail grid in the plurality of rail grids comprises a plurality of rails having spaces there between.

13. The apparatus according to claim 12, further comprising a staging lift platform for each rail grid, the staging lift platform is configured to move below the length of rail grid and vertically with respect to the rail grid in the Z-axis direction.

14. The apparatus according to claim 13, wherein the staging lift platform is configured to move up through the rail grid from below the rail grid to thereby lift a cup off the staging lane structure and wherein the lift platform is further configured to move down through the rail grid from above the rail grid to thereby place the cup onto the staging lane structure in a different location.

15. The apparatus according to claim 14, further comprising a Z-actuator and a Y-actuator that move the cup placement device in the Z-axis direction and the Y-axis direction to automatically place the cups in the plurality of locations along the staging lane structure.

16. The apparatus according to claim 15, wherein the rail grid comprises an angled front edge and wherein the staging lift platform comprises a raised front edge that defines a plowing structure configured to move ice and other objects off of the rail grid.

17. The apparatus according to claim 12, wherein the X-transport structure is configured to move a cup from the dispensing lane structure to the staging lane structure.

18. A beverage dispensing apparatus extending along an X-axis direction, a Y-axis direction that is perpendicular to the X-axis direction, and a Z-axis direction that is perpendicular to the X-axis direction and perpendicular to the Y-axis direction, the beverage dispensing apparatus comprising:
   a staging lane structure that has a length in the Y-axis direction and a width in the X-axis direction;
   an X-transport structure comprising a rail grid located above the staging lane structure with respect to the Z-axis direction, the rail grid being configured to move a cup in the X-axis direction with respect to the staging lane structure; and
   a lift platform that is configured to move below the length of the staging lane structure and vertically with respect to the staging lane structure in the Z-axis direction;
   wherein the lift platform is configured to move up through the staging lane structure from below the staging lane structure to thereby lift a cup off the dispensing lane structure from one of the plurality of cup placement locations and wherein the lift platform is further configured to move down through the staging lane structure from above the staging lane structure to thereby place the cup onto the staging lane structure in a different one of the plurality of cup placement locations.

19. The apparatus according to claim 18, further comprising Y and Z actuators that move the lift platform in the Y-axis and Z-axis directions, respectively.

20. The apparatus according to claim 19, wherein the staging lane structure comprises a rail grid defined by a plurality of rails having spaces therebetween and wherein the lift platform comprises a plurality of rails that are positioned to move within the spaces between the plurality of rails of the rail grid.

21. A beverage dispensing apparatus extending along an X-axis direction, a Y-axis direction that is perpendicular to the X-axis direction, and a Z-axis direction that is perpendicular to the X-axis direction and perpendicular to the Y-axis direction, the beverage dispensing apparatus comprising:
   a dispensing lane structure;
   a cup placement device configured to place cups in a plurality of cup placement locations along the dispensing lane structure;
   a staging lane structure that extends from front to back in the Y-axis direction and from side to side in the X-axis direction, wherein the staging lane structure comprises a plurality of rail grids that are laterally spaced apart from each other in the X-axis direction;
   an X-transport structure comprising a rail grid located above the staging lane structure with respect to the Z-axis direction, the X-transport structure being configured to move a cup in the X-axis direction from the dispensing lane structure to each of the plurality of rail grids at the back of the staging lane structure.

22. The beverage dispensing apparatus according to claim 21, further comprising a lift platform that is configured to move below the length of the dispensing lane structure and vertically with respect to the dispensing lane structure in the Z-axis direction;
   wherein the lift platform is configured to move up through the dispensing lane structure from below the dispensing lane structure to thereby lift a cup off the dispensing lane structure from one of the plurality of cup placement locations and wherein the lift platform is further configured to move down through the dispensing lane structure from above the dispensing lane structure to thereby place the cup onto the dispensing lane structure in a different one of the plurality of cup placement locations.

23. The beverage dispensing apparatus according to claim 22, wherein the staging lane structure comprises a rail grid defined by a plurality of rails having spaces therebetween and wherein the lift platform comprises a plurality of rails that are positioned to move within the spaces between the plurality of rails of the rail grid.

24. The beverage dispensing apparatus according to claim 23, wherein the dispensing lane structure has a length in the Y-axis direction and a width in the X-axis direction.

25. The beverage dispensing apparatus according to claim 21, further comprising a control system that controls movement of the X-transport structure to back fill the staging lane structure based upon a current location of cups located in the staging lane structure.

26. The beverage dispensing apparatus according to claim 25, further comprising a cup identification system that comprises an information unit that identifies the current location of cups located on the staging lane structure to a user.

* * * * *